US012657272B2

(12) United States Patent
Wang et al.

(10) Patent No.: US 12,657,272 B2
(45) Date of Patent: Jun. 16, 2026

(54) WEAK AUTHENTICATION USING SEMANTIC MAPPING

(71) Applicant: Lenovo Enterprise Solutions (Singapore) Pte. Ltd., Singapore (SG)

(72) Inventors: Mengnan Wang, Durham, NC (US); Kevin W. Beck, Raleigh, NC (US); Song Wang, Cary, NC (US); Robert James Norton, Jr., Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 59 days.

(21) Appl. No.: 18/637,029

(22) Filed: Apr. 16, 2024

(65) Prior Publication Data

US 2025/0322049 A1     Oct. 16, 2025

(51) Int. Cl.
    *G06F 21/32*        (2013.01)
    *G06T 19/00*        (2011.01)
    *G06V 40/20*        (2022.01)
(52) U.S. Cl.
    CPC ............ *G06F 21/32* (2013.01); *G06T 19/006* (2013.01); *G06V 40/20* (2022.01)
(58) Field of Classification Search
    CPC ........ G06F 21/32; G06T 19/006; G06V 40/20
    See application file for complete search history.

(56) References Cited

U.S. PATENT DOCUMENTS

| | | | |
|---|---|---|---|
| 10,205,740 B2 * | 2/2019 | Stirtzinger | .......... H04L 63/1408 |
| 2018/0285538 A1 * | 10/2018 | Zhu | ........................ G06F 21/31 |
| 2020/0372374 A1 * | 11/2020 | Sun | ....................... H04L 63/101 |
| 2022/0383604 A1 * | 12/2022 | McCall | ................... G06T 17/20 |
| 2023/0274511 A1 * | 8/2023 | Miller | ...................... G06T 7/60 |
| | | | 345/633 |
| 2025/0166294 A1 * | 5/2025 | Bertolli | ................. A63F 13/837 |

* cited by examiner

*Primary Examiner* — Sm A Rahman
(74) *Attorney, Agent, or Firm* — FERENCE & ASSOCIATES LLC

(57)               ABSTRACT

One embodiment provides a method, the method including: identifying, using a semantic mapping authentication system, a strong authentication match of a user has been received for a semantically mapped space; capturing, using at least one image capture sensor and at least one image depth capture sensor, behaviors of the user within the semantically mapped space; comparing, using the semantic mapping authentication system, the behaviors of the user against a profile of the user, wherein the profile includes previously stored behaviors of the user within the semantically mapped space; and performing, using the semantic mapping authentication system, an authentication action based upon a result of the comparing. Other aspects are claimed and described.

18 Claims, 3 Drawing Sheets

WEAK AUTHENTICATION USING SEMANTIC MAPPING

BACKGROUND

Many entities create, have access to, store, and/or the like, restricted or sensitive information. It is important to keep sensitive or restricted information secret or hidden from people or entities that are not authorized to access the information. Information commonly considered sensitive or restricted information is personal identification numbers, proprietary information, classified information, health or medical records, and/or any information that certain people or entities are not supposed to see or otherwise have access to.

Not only can information be considered sensitive or restricted, but physical locations can also be considered sensitive or restricted. A sensitive or restricted location means that only certain people are allowed to be within the physical space. Such physical locations may include areas having secret objects, areas allowing access to secure or restricted information, and/or the like. Additionally, spaces which certain people are not allowed or expected to be may be considered sensitive or restricted. For example, a building of a company may be restricted because people who are not employees or who do not have an employee escort are not allowed to be within the building. As another example, a home of a person may be considered restricted because only certain people are expected to be within the home.

BRIEF SUMMARY

In summary, one aspect provides a method, the method including: identifying, using a semantic mapping authentication system, a strong authentication match of a user has been received for a semantically mapped space; capturing, using at least one image capture sensor and at least one image depth capture sensor, behaviors of the user within the semantically mapped space; comparing, using the semantic mapping authentication system, the behaviors of the user against a profile of the user, wherein the profile includes previously stored behaviors of the user within the semantically mapped space; and performing, using the semantic mapping authentication system, an authentication action based upon a result of the comparing.

Another aspect provides a system, the system including: a processor; a memory device that stores instructions that, when executed by the processor, causes the system to: at least one image capture sensor; at least one image depth capture sensor; a processor operatively coupled to the at least one image capture sensor and the at least one image depth capture sensor; a memory device that stores instructions that, when executed by the processor, causes the system to: identify, using a semantic mapping authentication system, a strong authentication match of a user has been received for a semantically mapped space; capture, using the at least one image capture sensor and the at least one image depth capture sensor, behaviors of the user within the semantically mapped space; compare, using the semantic mapping authentication system, the behaviors of the user against a profile of the user, wherein the profile includes previously stored behaviors of the user within the semantically mapped space; and perform, using the semantic mapping authentication system, an authentication action based upon a result of the comparing.

A further aspect provides a product, the product including: a computer-readable storage device that stores executable code that, when executed by a processor, causes the product to: identify, using a semantic mapping authentication system, a strong authentication match of a user has been received for a semantically mapped space; capture, using at least one image capture sensor and at least one image depth capture sensor, behaviors of the user within the semantically mapped space; compare, using the semantic mapping authentication system, the behaviors of the user against a profile of the user, wherein the profile includes previously stored behaviors of the user within the semantically mapped space; and perform, using the semantic mapping authentication system, an authentication action based upon a result of the comparing.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
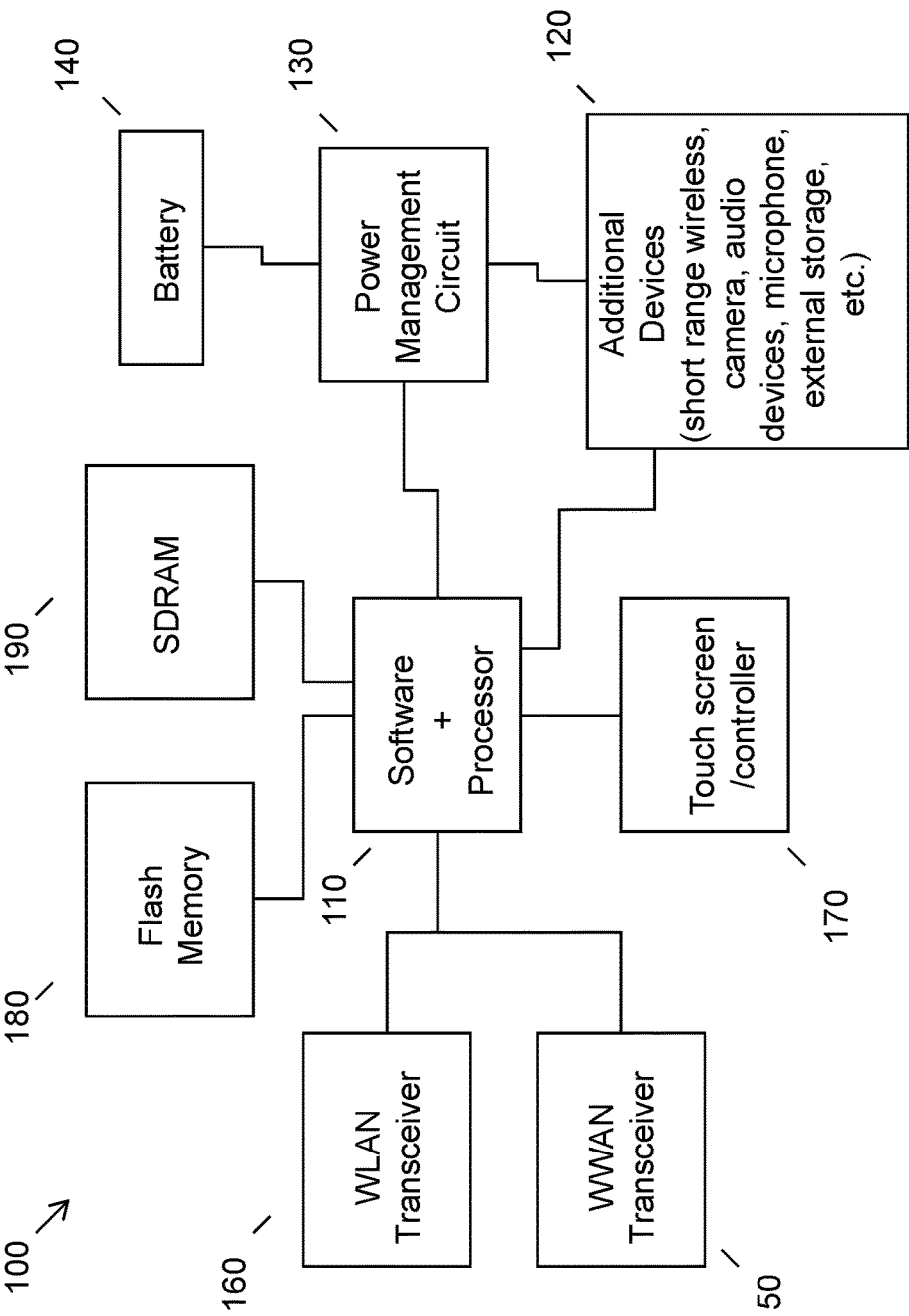
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In order to keep sensitive or restricted information or spaces secure, users can employ one or more techniques to secure the information or space. One technique that is often utilized is requiring authentication of users or people attempting to access information or a space. Authentication requires that a user provide some information that can be verified as belonging to an individual. The authentication system then ensures that individual is authorized to access the information or space that the user is attempting to access. If the authentication is successful, the user is granted access to the information or space. On the other hand, if the authentication is unsuccessful, meaning there is not a match between the provided authentication information and information corresponding to an authorized user, the user is prevented from accessing the target information or space. Thus, authentication is important to ensure that people or entities do not access sensitive or restricted information that they do not have authorization to access.

There are different authentication techniques and the chosen technique may be based upon a security level associated with the information or space. For example, higher security levels may require stronger or more frequent authentication than lower security levels. Strong authentication is generally considered an authentication that requires the provision of credentials, biometric information, coded identification tags, or other information or objects which are difficult to replicate and which more accurately ensure that a person providing the authentication is actually the person who corresponds to the authentication. In other words, strong authentication techniques are authentication techniques that verify an identity of a person and can verify whether the identity of the person matches an authorized user. Fingerprint scans, iris scans, user credentials (e.g., login name and password, etc.), two-factor authentication, badge or key swipes or presentation, and/or the like, are considered strong authentication techniques.

Secondary authentication techniques, often referred to as weak authentication techniques, may be used to enhance security and detect threats after an authenticated session has been started. Generally, secondary authentication techniques are continuous authentication techniques that continuously authenticate a user while in an authenticated session. In other words, the secondary authentication techniques attempt to determine changes in something that would indicate that the person who was authenticated using the strong authentication technique is no longer the person who is within the authenticated session. Additionally, the weak authentication techniques perform the authentication throughout the authenticated session, either constantly or at periodic intervals during the authenticated session.

However, since the secondary authentication occurs at frequent intervals during an authenticated session, they need to be able to be performed quickly and utilize less processing resources than strong authentication techniques so they are less obtrusive than strong authentication techniques. Thus, weak authentication techniques are generally authentication techniques that do not identify an identity of a person. Rather, weak authentication techniques are usually utilized after an identity of a person has been verified using a strong authentication technique to ensure that the same person is accessing the information or space. In other words, weak authentication techniques generally ensure that a person and the same person is accessing the information or space as compared to the person who provided the strong authentication, but is unable to or does not verify the identity of the person.

Some weak authentication techniques are liveness detection techniques that identify the detected entity or object is a living object, audio authentication techniques that determine audio captured during an authenticated session matches other audio captured during the authenticated session and that additional audio is not captured or detected, image techniques that detect a person but do not verify an identity of the person, pressure techniques that detect a person is sitting in a chair or standing at a location that is associated with the authenticated session, and/or the like. These authentication techniques can generally determine that nothing has changed since the user was authenticated using a strong method (e.g., the user did not leave the device and another user took their place, the user did not leave an authenticated session running and then leave a device or space, and/or the like), but may be unable to definitively identify an identity of the user.

Generally, the most optimal weak authentication techniques are selected based upon the use case that they will be used within. For example, if the use case is a situation where a person will be talking a lot, an audio-based secondary authentication technique may be the best choice. Similarly, if a person will be working at a device that has a camera for the authenticated session, then an image-based secondary authentication technique or pressure-based secondary authentication technique may be a good choice. However, secondary authentication techniques for physical spaces are limited.

Accordingly, the described system and method provides a technique for performing secondary or weak authentication utilizing a semantic mapping of a space by capturing behaviors of a user within the space and comparing the behaviors of the user to a profile including previously stored behaviors of the user within the space. After the semantic mapping authentication system has identified that a strong authentication match of a user has been received for a semantically mapped space, the system captures behaviors of the user within the semantically mapped space. The system captures the behaviors of the user using at least one image capture sensor and at least one image depth capture sensor, which may be a part of the same device. In other words, many cameras or other devices have the ability to capture both image data and depth data within an image. Thus, the image capture sensor and the image depth sensor do not have to be located on different devices or even different components within a device. This information allows the system to semantically map the space with the user within the space. Semantic mapping refers to reconstructing a three-dimensional model of the space with depth information so that objects, including live objects, can be recognized within the space.

As the user moves around the space and interacts with objects in the space, behaviors of the user can be identified. The behaviors of the user refer to movements of the user and interactions of the user with objects within the space. Since users typically develop a routine, even if it is not a conscious development of a routine, the behaviors of the user can be tracked, monitored, and analyzed to develop a profile of user behaviors within a space. Thus, upon receipt of behaviors that are captured within the semantically mapped space, the semantic mapping authentication system can compare those behaviors to the profile of the user. In other words, the system can compare the observed behaviors of the user to stored behaviors of the user for the same semantically mapped space. Based upon a result of the comparing, the system can perform an authentication action.

In the case of a match in response to the comparing, the authentication action may be that the system continues to capture the user behaviors, compare the captured user behaviors to the stored user profile, and perform an authentication action. In other words, the system continues to perform the secondary authentication while the user is within the space. If, on the other hand, there is a mismatch in response to the comparing, the authentication action may be sending a notification to another user of the mismatch, requesting the authenticated user who is associated with the initial strong authentication to perform another strong authentication, or some other action.

Therefore, a system provides a technical improvement over traditional methods for weak or secondary authentication. Unlike traditional secondary authentication techniques, the described system and method provides a technique for performing secondary or continuous authentication within a physical space utilizing a semantic mapping of the space. The described system and method are able to capture information about the user as they move around the space and interact with objects within the space. Based upon this information, the system can determine whether the user within the space is an expected user based upon a profile of the user who was authenticated using a strong authentication technique. This provides a system and method for performing secondary or weak authentication within a physical space that has not been previously contemplated in traditional secondary authentication techniques. Therefore, the described system and method provides for a continuous and unobtrusive authentication technique for a physical space. Additionally, since the frequency of the secondary authentication can be modified, the described system and method can be optimized for authentication in view of resource usage of an authenticating device.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/ rendering. System 100 also typically includes various memory devices, for example flash memory 180 and synchronous dynamic random-access memory (SDRAM) 190.

Figure 2:
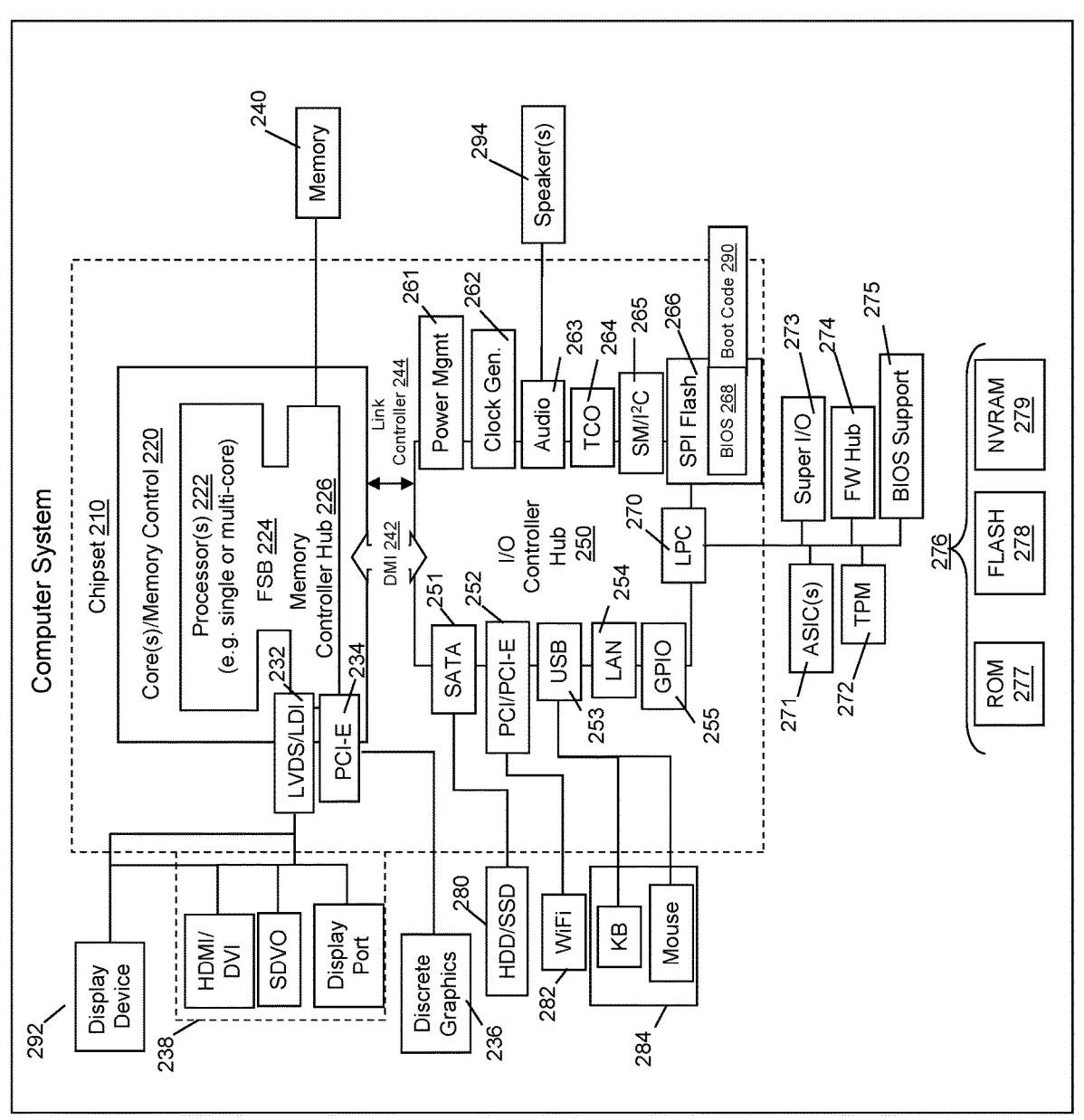
FIG. 2 illustrates another example of information handling device circuitry.

FIG. 2 depicts a block diagram of another example of information handling device circuits, circuitry, or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in devices or systems associated with servers and networks to which servers may be added or provisioned and devices or systems that may assist in identifying servers to be provisioned and provisioning the servers. For example, the circuitry outlined in FIG. 1 may be implemented in a tablet or smart phone embodiment, whereas the circuitry outlined in FIG. 2 may be implemented in a personal computer embodiment.

Figure 3:
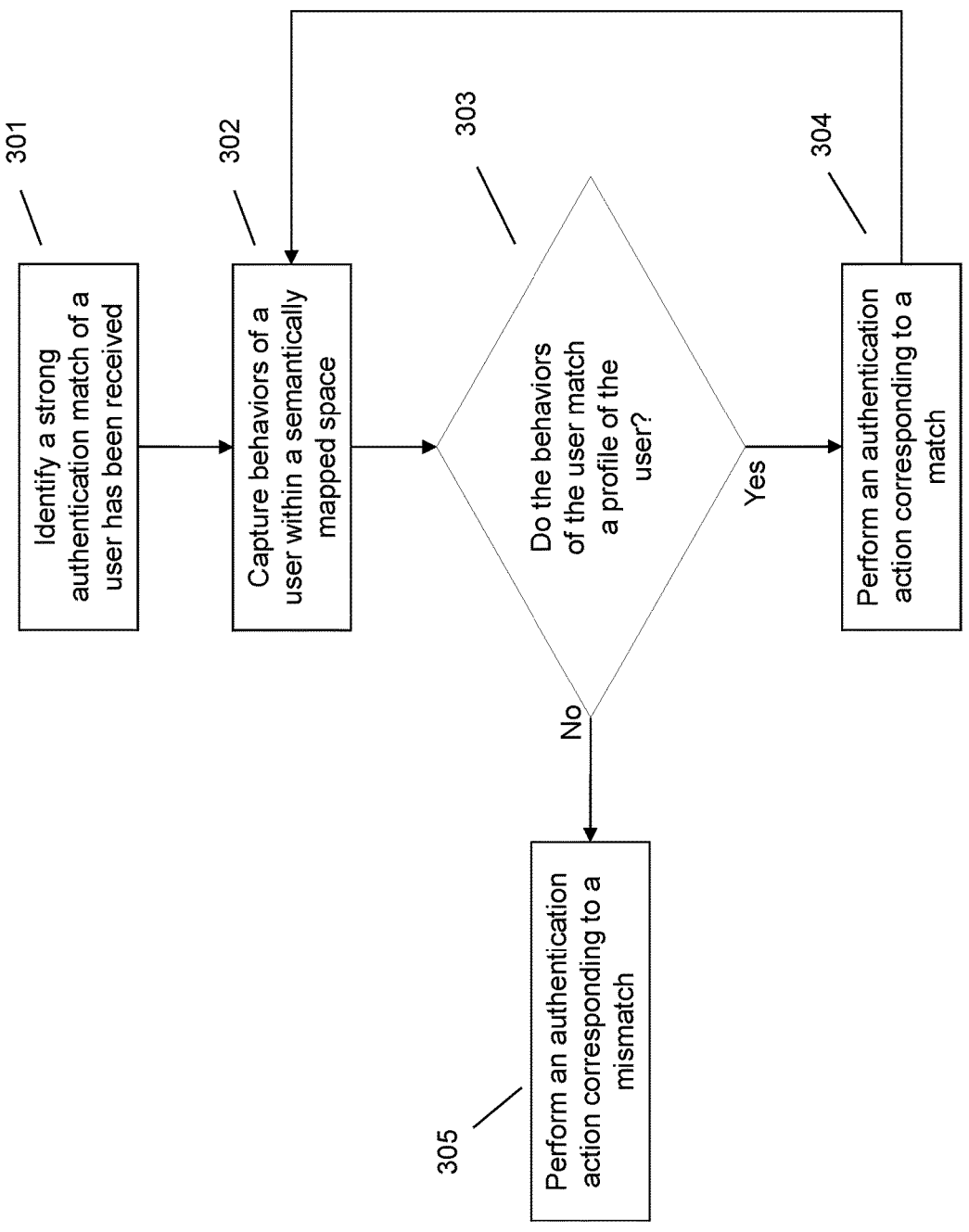
FIG. 3 illustrates an example method for performing weak authentication utilizing a semantic mapping of a space by capturing behaviors of a user within the space and comparing the behaviors of the user to a profile including previously stored behaviors of the user within the space.

FIG. 3 illustrates an example method for performing weak authentication utilizing a semantic mapping of a space by capturing behaviors of a user within the space and comparing the behaviors of the user to a profile including previously stored behaviors of the user within the space. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to perform weak authentication utilizing semantic mapping and monitoring. Additionally, the semantic mapping authentication system includes modules and features that are unique to the described system.

The activation of the semantic mapping authentication system may be manual, where a user provides an input indicating that the semantic mapping authentication system should be activated, or automatic where the semantic mapping authentication system detects a trigger event indicating that the system should be activated. Example trigger events include detection of a strong authentication match for a semantically mapped space, activation of software or an application utilizing the semantic mapping authentication system, activation of a device that is utilized for semantic mapping or secondary authentication within a semantically mapped space, and/or the like. For example, the system may detect that a person is attempting to access a restricted or sensitive space and has provided strong authentication information that matches an authenticated user. This authorized access of the space may be considered a trigger event that activates the semantic mapping authentication system. As another example, detection of a user within a restricted space or detection of an attempt to access a restricted or sensitive space may be identified as a trigger event.

The semantic mapping authentication system may be a standalone system, may be accessible through other computing devices, and/or a combination thereof. For example, the semantic mapping authentication system may be a standalone system that can be accessed by a user and/or may be or provide an application that is accessible by a user on another computing device. The semantic mapping authentication system may be accessible using any type of computing device, for example, personal computer, laptop computer, smartphone, tablet, smartwatch, head-mounted display, smart television or other smart appliance, augmented reality device, virtual reality device, and/or the like. Thus, the semantic mapping authentication system may be accessible locally using a computing device where the semantic mapping authentication system is installed and/or may be accessible remotely through another computing device. For example, the semantic mapping authentication system may be accessed by a user who has received an alert indicating a mismatch from the comparison utilizing a device of the user that communicates with the semantic mapping authentication system to access the information related to the alert. However, the semantic mapping authentication system may be located and operate on a different information handling device to perform the described steps.

The semantic mapping authentication system may have an associated graphical user interface. The graphical user interface may be provided on a display or monitor, which may or may not be associated with the semantic mapping authentication system. In other words, the semantic mapping authentication system may have a dedicated display or monitor or may be accessible using any display or monitor. In either case, the semantic mapping authentication system may provide instructions to generate and display the graphical user interface on the display device being used to access the semantic mapping authentication system. The graphical user interface may also be updated and managed based upon instructions provided by the semantic mapping authentication system. In other words, the semantic mapping authentication system generates and transmits instructions to create and update the graphical user interface.

The graphical user interface may include a plurality of tabs, windows, and/or unique interfaces. The graphical user interface may include graphical user interface icons or elements. Graphical user interface icons or elements may include static non-selectable elements (e.g., headers, footers, logos, global information areas, graphics, etc.), dynamic non-selectable elements (e.g., local information areas applying to a specific element, dynamic graphics, information areas that update based upon the information provided therein, indicators, statistics displays, etc.), static selectable elements (e.g., radio buttons, menu icons, selectable indicators, etc.), dynamic selectable elements (e.g., form field input areas, pull-down menus, pop-up windows, etc.), and/or any other elements that may be found in a graphical user interface.

The graphical user interface may allow a user to provide input identifying information to be used by the semantic mapping authentication system. For example, the semantic mapping authentication system may utilize a user profile that includes stored behaviors of a user. The graphical user interface may allow for a user to provide input to the user profile, adjust stored behaviors within the user profile, identify new semantically mapped locations that need added to the user profile, remove information from the user profile, modify behavior correlations, and/or the like. The graphical user interface may also allow a user to review any alerts or notifications that have been provided by the semantic mapping authentication system, either in real-time or historical alerts or notifications. The user may also provide information or notes in relation to an alert or notification through the graphical user interface.

Within the graphical user interface, the user may also identify, select, remove, and/or otherwise modify devices that may be utilized to perform the semantic mapping. The user may also access information related to these devices, for example, information identifying device identifiers, device components or sensors, the location of the devices, and/or the like. Additionally, the graphical user interface may allow a user to access semantic maps of spaces and modify information contained within these mappings, for example, entity labels, three-dimensional maps of the environment, and/or the like. Input may be provided by the user using any type of input modality, including, but not limited to, mechanical input (e.g., keyboard input, mouse input, etc.), touch input, audible or voice input, gesture input, haptic input, input from an augmented reality or virtual reality device, and/or the like.

The graphical user interface may also provide displays that display information from the semantically mapped spaces, user profiles, semantic mapping devices, alerts, notifications, successful and unsuccessful authentications, and/or the like. It should be noted that the information to be used by the semantic mapping authentication system and information provided by the semantic mapping authentication system can be different for different applications, different computing systems, different users, and/or the like. Thus, the information corresponding to input or output of the semantic mapping authentication system are not always the same. However, the semantic mapping authentication system may have default or system-wide settings that are the same across different users, systems, applications, and/or the like, until the information is adjusted or otherwise changed.

It should be noted that different users may configure the graphical user interface per their preferences. Thus, the graphical user interface layout and configuration may be different between users. How much a user can configure the layout may be restricted or set by a system administrator and/or the like. Additionally, different users or different user roles may have different levels of access, which may also change how and what information is displayed. Thus, different graphical user interfaces may be displayed by the system.

The semantic mapping authentication system may utilize one or more artificial intelligence models in performing semantic mapping of a space, identifying and analyzing behaviors of a user, generating a profile of a user, and identifying what authentication action to be performed. Artificial intelligence models may also be used for steps within a step. For example, a model could be utilized to analyze movements and interactions of a user to identify a behavior, perform semantic mapping based upon captured image and depth data, and/or the like. For ease of readability, the majority of the description will refer to a single artificial intelligence model. However, it should be noted that an ensemble of artificial intelligence models or multiple artificial intelligence models may be utilized. Additionally, the term artificial intelligence model within this application encompasses neural networks, machine-learning models, deep learning models, artificial intelligence models or systems, and/or any other type of computer learning algorithm or artificial intelligence model that may be currently utilized or created in the future.

The artificial intelligence model may be a pre-trained model that is fine-tuned for the semantic mapping authentication system or may be a model that is created from scratch. Since the semantic mapping authentication system is used in conjunction with semantic mapping of a space, analyzing user behaviors, generating a user profile, and comparing user behaviors against a profile, some models that may be utilized by the system are image analysis models, entity identification models, similarity identification models, analysis models, filtering models, classification models, and/or the like. The model may be trained using one or more training datasets. Additionally, as the model is deployed, it may receive feedback to become more accurate over time. The feedback may be automatically ingested by the model as it is deployed. For example, as the model is used to semantically map a space, analyze user behaviors, generate a user profile, and compare user behaviors against a profile, if a user modifies information of a semantically mapped space, modifies information related to a user behavior or profile, provides feedback indicating that a comparison result is incorrect, or otherwise provides some indication that the predictions or selections made by the model may be incorrect, the model ingests this feedback to refine the model.

On the other hand, as the model semantically maps a space, analyzes user behaviors, generates user profiles, compares user behaviors against a profile, and/or the like, and no changes are made to the mapping, user behaviors, user profiles, comparison results, and/or the like, the model may utilize this as feedback to further refine the model. This may be referred to as reinforcement training where a prediction that was made by the model is reinforced as the correct prediction. Training the model may be performed in one of any number of ways including, but not limited to, supervised learning, unsupervised learning, semi-supervised learning, training/validation/testing learning, and/or the like.

As previously mentioned, an ensemble of models or multiple models may also be utilized. Some example models that may be utilized are variational autoencoders, generative adversarial networks, recurrent neural network, convolutional neural network, deep neural network, autoencoders, random forest, decision tree, gradient boosting machine, extreme gradient boosting, multimodal machine learning, unsupervised learning models, deep learning models, transformer models, inference models, and/or the like, including models that may be developed in the future. The chosen model structure may be dependent on the particular task that will be performed with that model.

The semantic mapping authentication system may include different components for carrying out different functions of the system, including different steps to be performed. These components may be hardware components or software components. Some hardware components may include image capture sensors and depth capture sensors to capture information about a space. The image data along with the depth data can be utilized to perform the semantic mapping of a space. Semantic mapping refers to reconstructing a three-dimensional model of the space with depth information so that objects, including live objects, can be recognized within the space. The system then assigns labels or names to each of the objects in the space. This allows the system to identify an object even if it has been relocated within the space.

This is in contrast to traditional space mapping techniques in which the system only knows that a user is interacting with something at a particular location. However, the traditional space mapping is unable to identify the object that the user might be interacting with at that location. Thus, if the object is moved to a different location, the traditional space mapping system does not recognize it as the same object and would identify such interactions as different than a stored behavior or interaction of the user. On the other hand, using the semantic mapping authentication system the system understands what object the user is interacting with in a particular location. If the object is moved to a new location and the user interacts with it at the new location, the semantic mapping authentication system recognizes the object and understands that the user behavior or interaction with the object matches the stored behavior even though the object is at a new location. This prevents false authentication failures that are due to changes in the location of an object within a space. As an example, if a user interacts with their phone, the semantic mapping authentication system recognizes the object as the user's phone. If the user interacts with the phone at the dining room table and then in the living room, the system can recognize that the user is interacting with the same object in both locations.

However, in order to perform the semantic mapping, the semantic mapping authentication system needs to capture both image data and depth data corresponding to the space or environment. There are many different devices or systems that can be utilized that can capture either image data, depth data, or both. Some techniques for capturing depth data include the use of radar, LiDAR, infrared systems, and/or the like. These are merely illustrative examples as any device or sensor that can capture depth information can be utilized. Some example systems or devices that may be utilized include, but are not limited to, surveillance cameras, smart phones, augmented reality devices, virtual reality devices, three-dimensional cameras, and/or the like. The depth information and the image capture may be captured by the same device, same component on a single device, different devices, and/or the like. Additionally, multiple devices having one or more depth capture sensors and/or image capture sensors may be utilized to capture depth information and/or image information. Performing the semantic mapping may be assisted utilizing one or more artificial intelligence models, for example, to reconstruct the three-dimensional model of the space, assign names or labels to entities within the space, and/or the like.

A software component that is utilized in the system is the profile of the user. The profile of the user includes previously stored behaviors of the user within a semantically mapped space. Each semantically mapped space has a corresponding behavior profile of a user that is authorized to access the space that includes the previously stored behaviors. Each of these profiles will be referred to as a behavior profile for ease of readability. Thus, a behavior profile is a profile of behaviors of a user within a specific semantically mapped space. Accordingly, the profile of the user may contain more than one behavior profile since the user may be permitted to access more than one restricted or sensitive space, for example, a home, a company, a room or portion of a building, a vehicle, and/or the like. Behaviors of a user include movements of a user within a space and interactions the user has or performs with objects, including living objects, within the space.

To create a behavior profile the system is essentially set in a training mode. The training mode allows the system to capture behaviors of a user within a space. Before capturing behaviors of the user within the space, the space may first be semantically mapped. This provides the system with a baseline of what objects are contained within the space. Once a user enters the space, the semantic mapping authentication system monitors the user and collects information about the behavior of the user within the space. The behaviors are captured using at least one image capture sensor and at least one image depth sensor. In other words, in order to accurately identify behaviors of the user, the system must be able to semantically map the space while the user is within the space. Accordingly, the system utilizes components or devices that can capture the information (i.e., image information and depth information) that is needed to semantically map the space.

Behaviors of the user refer to the movements of the user within the space and interactions by the user with objects within the space. Movements of the user include movements used to traverse within the space, movements occurring in a single location within the space but not interacting with an object (e.g., stretching, jumping, exercising, etc.), and/or other movements of the user where the user is not interacting with an object within the space. It should be noted that non-movement (e.g., sitting, standing, holding a position for a length of time, etc.) is also captured within the movement portion of the behavior. In other words, lack of movement is also considered a movement for purposes of identifying behaviors of a user.

Interactions with objects encompass all interactions that a user may have with an object, whether the object is touched by a user or not. Interactions with objects encompasses input or output interactions using a modality other than touch, for example, audible interaction, visual interaction, haptic interaction, gesture interaction, and/or the like. Thus, looking at an object from a distance is considered an interaction, even though the user is not touching the object. As another example, providing audible input to an object is considered an interaction. As a final, non-limiting, example, listening to output from an object is also considered an interaction. Thus, interactions include all interactions that a user performs that utilize at least one object.

From the behaviors of the user within the space, particularly over time, the semantic mapping authentication system can identify patterns of a user within the space. Thus, from the behaviors captured during the training, the system may analyze the behaviors to identify patterns of the user within the space. For example, when a user enters a home, they may first take off their shoes, put their keys away, and put their coat away. This is a pattern of a user that occurs when the user enters the home. Accordingly, from the captured behaviors, the system can identify the patterns of the user and from these patterns can create a behavior profile of the user within the space. While the simplified example of a user entering the home was described, it should be understood that a behavior profile of the user within a space includes many different patterns and each of the patterns may be based upon different factors related to the behavior. For example, if a user is not wearing a coat when entering the home, the user will not put the coat away. Thus, whether the user is wearing a coat or not will change the pattern of behavior. Accordingly, the behavior profiles of a user for a space are very complex and may take into account many different factors, objects, and/or the like, to accurately reflect the behavior of the user within the space.

Each semantically mapped space has an associated behavior profile of the user within the space, meaning that since a user may behave differently in different spaces due to different purposes for being within a space, different objects within a space, and/or the like, each space has a unique behavior profile of the user. However, behavior profiles of the user for spaces other than a target space may be used to help create, validate, or influence a behavior profile of the user in the target space. For example, even though a user may interact with different objects in different spaces, the user may still perform certain movements or interactions in a similar manner as when in other spaces that already have a behavior profile for a user. For example, how a user walks or traverses a space may be similar as how they traverse a different space. Thus, the system can pull information from other behavior profiles of the user for other spaces in order to assist in populating the behavior profile for the user for the target space.

Additionally, behavior profiles for other spaces may be able to be used to assist in verifying or validating a behavior profile for a target space. For example, if a particular space has extremely confidential information that only a few people are allowed to access, the system may determine that extra measures should be taken to verify that a user is actually an authorized user. One technique for doing this may be to compare behavior profiles for a user across different spaces and determine if there are any similarities between the behavior profiles. The semantic mapping authentication system can determine if there are enough similarities between the behavior profile for the target space and other behavior profiles for the same user that would indicate a likelihood that the user in the target space is the same user as found in other behavior profiles. If so, the system may confirm the behavior profile for the target space as a behavior profile of the user for the target space and save this behavior profile for the target space within the profile of the user.

While an example of needing extra measures to ensure the user is the correct user was utilized, it should be noted that this is not a requirement of performing the cross behavior profile verification. Rather, the cross behavior profile verification can be performed for any reason and may be performed whenever a new behavior profile is being generated. Whether such a verification occurs may be a default setting, chosen by an administrator of the semantic mapping authentication system, by an entity employing the system, by a user of the system, and/or the like.

Artificial intelligence models can be used when semantically mapping a space. For example, the models can be used to identify objects within the space and provide labels for objects and entities found within the space. Artificial intelligence models can also be used in the capturing of the user behavior within the space. For example, the models can be used to analyze the behaviors of the user to generate a behavior profile of the user and then used to create a profile of the user from the behavior profiles. Additionally, models can be used in performing any verification of information contained within one or more behavior profiles within the profile of the user. Additionally, or alternatively, the artificial intelligence models can be used to perform other steps, assist in performing some of the steps, and/or the like.

At 301, the semantic mapping authentication system identifies a strong authentication match of a user has been received for a semantically mapped space. Since the semantic mapping authentication is a secondary authentication, it is not activated until a strong authentication match of a user has been received. The strong authentication match can be any type of strong authentication, for example, provision of credentials, provision of a passcode, two-factor authentication, biometric scanning, facial recognition, object presentation (e.g., identification card at a card reader, key at a lock, passcode at a lock, etc.), a combination thereof, and/or the like. Upon provision of the strong authentication information, a strong authentication system can determine whether the strong authentication information matches a user who is authorized to access the semantically mapped restricted or sensitive space. If the information matches an authorized user, the strong authentication system may allow the user access to the space.

The strong authentication system may also provide information to the semantic mapping authentication system of the strong authentication and the user who has been authorized to access the space. Alternatively, or additionally, the semantic mapping authentication system can automatically be activated once a user enters the semantically mapped space, regardless of whether information was received from the strong authentication system. In the case that the semantic mapping authentication system does not receive an identification of the user who was authentication from either the strong authentication system or another system, the semantic mapping authentication system may perform actions to identify the user so that the system can access a profile for the user who is within the space. Identification can occur utilizing information captured while the user is within the space, for example, audio from the user, images that can be used for facial recognition, and/or the like. Identification may also be based upon accessing a secondary system, for example, a room log that identifies the credentials and corresponding user that enter a space, a security system that identifies users who are authorized to enter the space, schedules of users, and/or the like.

At 302, behaviors of the user within the semantically mapped space are captured using at least one image capture sensor and at least one image depth capture sensor. As with the training part of the system, behaviors refer to movements of the user within the space and interactions of the user with objects within the space. Thus, the system may capture the movements and interactions of the user within the semantically mapped space and analyze the movements and the interactions to identify the behaviors of the user. Capturing the behaviors may be performed using similar devices as discussed in connection with the training for creating the behavior profiles. It should be noted that different devices may be used to create the behavior profiles than used for capturing the behaviors. For example, a user may wear an augmented reality headset when performing the training to create one or more behavior profiles. However, during the capturing at 302 the system may utilize surveillance cameras to capture the user behaviors. Effectively the description regarding training the system to create behavior profiles can be applied to capturing the behaviors at 302 except that the data collection at 302 does not result in a creation of a behavior profile. However, the data collection at 302 can be utilized to assist in refining an artificial intelligence model based upon a result of the comparison that occurs at 303.

At 303, the semantic mapping authentication system can determine if the behaviors of the user captured at 302 match a profile of the user. To make this determination, the system can compare the behaviors of the user captured at 302 against a profile of the user. As previously discussed, the profile of the user includes previously stored behaviors of the user within the semantically mapped space. Stated differently, the behaviors of the user captured at 302 can be matched against a behavior profile of the user that has been previously stored for the semantically mapped space that the user is within at 302. Thus, the system accesses a behavior profile for the specific user and for the specific space and utilizes this behavior profile to make the comparison between the behaviors of the user captured at 302 and the behavior profile.

When making the comparison, the semantic mapping authentication system may utilize an artificial intelligence model to determine whether the behaviors captured at 302 match the profile of the user. Even though each behavior profile is for a specific user for a specific space, the behavior profile is still quite complex and includes a significant amount of information. For example, the user may behave differently based upon different factors which can be internal or external to the space. As an example, if the weather is cold outside, the user may be wearing additional clothing (e.g., hoodie, coat, sweater, different layers, etc.) and in the case that the space is warm, may remove some of this extra clothing. However, in the case of warm weather, the user would not perform these behaviors. As another example, if certain objects or other people are within the space, the user may behave differently as compared to when those objects or other people are not within the space. Thus, the behavior profile has to account for all of these different factors in order to minimize false authentication successes or failures. Accordingly, the comparison at 303 may be very complex and require comparison algorithms and systems in order to accurately and quickly make the comparison. An artificial intelligence model may be quite effective and efficient at performing this comparison analysis.

Since the behaviors of a user can vary and maybe not all different possible factors are accounted for within the behavior profile, the system may not be able to find a perfect match between the behaviors captured at 302 and the behavior profile. However, instead of identifying this as a mismatch, the system may attempt to determine if there is a similarity between the captured behaviors and the behavior profile. In other words, the comparing may include determining whether the behaviors of the user match the profile of the user within a predetermined threshold level of similarity. The predetermined threshold may be a default threshold, set by a user, set by a system administrator, set by an entity, and/or the like. Additionally, the predetermined threshold may vary based upon use case or application. For example, a space having a higher security level than another space may having a higher predetermined threshold, meaning the match must be closer than for the lower security level space. The predetermined threshold may also vary based upon the user, the space being accessed, and/or the like. The similarity comparison may be performed using any type of similarity comparison technique, including, but not limited to, cosine similarity measures, Euclidean distance measures, cluster analysis, and/or the like.

If the behaviors of the user do not match the profile of the user at 303, the semantic mapping authentication system can, at 305, perform an authentication action corresponding to a mismatch result returned from the comparing. A mismatch result means that the user behavior captured at 302 does not match the stored user behavior for the semantically mapped space. Specifically, a mismatch is any comparison result that is not considered a match. The mismatch results in a secondary or weak authentication failure. The system then performs an authentication action responsive to this authentication failure. The authentication action may be one or more actions that may be set by the system, set by an administrator of the system, set by an entity employing the system, set by a user, and/or the like.

One authentication action that may be taken in the event of a mismatch is notifying the user who corresponds to the strong authentication that an authentication failure has been detected. The notification may be transmitted using any type of communication channel or modality, for example, text message, telephone call, direct message, social media message, message transmitted via the graphical user interface, and/or the like. The notification may be any type of notification, for example, pop-up notification, message, audible notification, visual notification, haptic notification, and/or the like. The notification may provide varying levels of information to the user. For example, the notification could simply notify the user that an authentication failure has occurred, may direct the user to access the semantic mapping authentication system, may include an image or video of the detected user within the space, and/or the like. The notification may allow the user to provide input, for example, by indicating the notification has been read, by indicating the authentication failure is correct or wrong, by indicating the notification should be sent to other users, and/or the like. The notification may also direct the user to perform some action, for example, provide strong authentication information, access the semantic mapping authentication system, perform a particular action that can be verified, and/or the like.

Other authentication failure actions may include notifying other users of the authentication failure, for example, an administrator of the authentication system, a security team, and/or the like. The notifications to these users may include the same or different information as the notification to the strongly authenticated user. Other authentication failure actions may include, but are not limited to, activating other devices (e.g., other cameras or devices that may be able to authenticate the user more strongly, devices that provide audible or visual warnings, etc.), taking actions to prevent access to the user within the space, and/or the like.

Multiple authentication failures during an authenticated session may cause an escalation in authentication actions that are performed. For example, an initial failure authentication action may be notifying the user associated with the strong authentication. Even if the user confirms that the authentication failure was incorrect, meaning that it is the strongly authenticated user that is in the space, additional secondary authentication failures may result in notifications being sent to users other than the strongly authenticated user, for example, a security team, an administrator of the authentication system, and/or the like. This could help prevent a person that may steal credentials of an authorized user and also hijack a notification communication to the user from continuing to be authenticated in the space by getting other people involved to verify the authentication failure. Alternatively, or additionally, this may also allow users to reset or otherwise modify a profile of the user in the case that it is indeed the strongly authenticated user within the space.

The strongest authentication actions may be taking actions to prevent the person from accessing the space or systems or devices within the space, for example, locking doors, locking devices, restricting access to objects within the space, and/or the like. However, these actions may only occur after approval from a user or other users that received notifications, after a particular number of authentications failures have occurred, after a predetermined period of time of no response from users that received notifications, and/or the like.

Depending upon the settings of the system, the secondary authentication may continue even in the case of a mismatch or authentication failure. This may assist the system in determining whether the failure was an error or may reinforce the unsuccessful authentication. On the other hand, the secondary authentication may halt if the authentication action is the result of a mismatch. In other words, upon an authentication failure, the system may stop capturing new information to perform authentication, and instead wait upon further instructions in view of the authentication failure.

If, on the other hand, the behaviors of the user do match the profile of the user at 303, the semantic mapping authentication system can, at 304, perform an authentication action corresponding to a match result returned from the comparing. A match means that the user behavior captured at 302 matches the stored user behavior of the semantically mapped space. It should be noted that a match may be defined as something less than a perfect match. In other words, a match does not necessarily mean that the captured behavior at 302 perfectly matches the stored behavior profile. Rather, the system may identify a captured user behavior as a match if it meets or exceeds a similarity threshold. In other words, if the captured user behavior is similar enough to the behavior profile, the system may identify this as a match. To make a determination regarding a similarity, the system may utilize one or more similarity comparison techniques, including, but not limited to, cosine similarity measures, Euclidean distance measures, cluster analysis, and/or the like. The system may also employ one or more artificial intelligence models in determining a similarity and/or otherwise identifying a match between the captured user behaviors and the behavior profile for the space.

In response to identifying a match between the captured user behaviors and the behavior profile, the semantic mapping authentication system performs an authentication action corresponding to a match result. Since a match result means that the secondary or weak authentication of the user within the space was successful, the authentication action is to iteratively continue the secondary authentication until a mismatch occurs or until the user leaves the space. Thus, the semantic mapping authentication system may return to step 202 to capture behaviors of the user within the semantically mapped space. These newly captured behaviors may then be compared to the behavior profile at 303. Based upon the comparison result (i.e., a mismatch or authentication failure or a match or authentication success), the semantic mapping authentication system either performs a mismatch/failure authentication action at 305 or a match/success authentication action at 304.

Secondary authentication is generally considered continuous authentication because it occurs at a particular frequency during an authenticated session. In some cases, the secondary authentication may occur constantly, meaning as soon as a comparison result has been identified and an authentication action has been performed, the system immediately captures new behaviors of the user within the space and performs the authentication analysis with respect to these new behaviors. Additionally, or alternatively, the system can continuously be capturing user behaviors, comparing the user behaviors to the profile of the user, and performing an authentication action, meaning that each of these steps are occurring simultaneously on different information.

However, to save resources (e.g., energy, memory, processing resources, etc.), the semantic mapping authentication system may be set to perform the secondary authentication (i.e., capturing behaviors of the user, comparing the captured behaviors against a profile of the user, and performing an authentication action) at predetermined intervals of time (e.g., every few seconds, every few minutes, a few times an hour, every hour, etc.) while the user is within the semantically mapped space. Since the secondary authentication will continue until the user leaves the semantically mapped space, even though the secondary authentication may be performed at predetermined intervals, this is still considered continuous authentication, even though it is not constant authentication. The frequency or length of the predetermined time intervals may be a default value, set by a user, set by an administrator of the system, set by a different entity, and/or the like.

It should also be noted that the frequency or length of the predetermined time intervals may be different for different use cases, may be different based upon a sensitivity of the space, different based upon the device utilized to semantically map the space, and/or the like. For example, a highly restricted space may perform constant secondary authentication, while a less restricted space may be set to perform secondary authentication at a lower frequency. As another example, secondary authentication performed using a device that is powered using a power plug may perform secondary authentication at a higher frequency than secondary authentication performed using a device that is powered using a battery.

As an overall non-limiting example of the described system, the semantic mapping authentication system may be deployed in a home of a user. In this use case, surveillance cameras, device cameras (e.g., smart phone cameras, tablet cameras, smart appliance cameras, laptop cameras, smart television cameras, smart watch cameras, doorbell cameras, augmented or virtual reality device cameras, etc.), cameras that are specifically set up for the semantic mapping authentication system, and/or the like, may be utilized to perform the semantic mapping of the home. It should be noted that the user may also set up the system to perform semantic mapping authentication for certain portions of the home and exclude other portions of the home. For example, entry areas and rooms directly connected to entry areas may be the only portions of the home that are set up with the system. As another example, the system may be set up for portions of the home that may be most likely to be entered by an intruder, while other areas of the home are excluded from the system. On the other hand, the entire home may be set up with the system. What portions of the home are included and excluded may be selected by the user or be based upon what portions have cameras that can be utilized to perform the semantic mapping.

In this example, the strong authentication may be the detection of a key being utilized to enter the home. As should be understood, key does not necessarily mean a physical key as digital keys or passcodes are common building and home entrance methods. Other strong authentication techniques may also be used, but for purposes of this example, a strong authentication was received that provides an idea of who has entered the home. While the user is in the home, the behavior of the user is captured by the system. These behaviors are compared to the profile of the user for the home. In other words, the captured behaviors are compared to the behavior profile of the user for the home. Upon successful secondary authentication, the system will continue to monitor the person within the home. If an unsuccessful authentication is identified, the system will perform whatever authentication action has been assigned for an unsuccessful authentication. For this example, the person has set up a notification technique that notifies the person that an authentication failure has been detected. The person can then either confirm that it was a true failure or can provide instructions to ignore the failure. This information can also be utilized by the artificial intelligence model to further train the models used within the system.

As another overall example, the system may be deployed in a restricted facility. In this case, the facility may utilize cameras that are specifically utilized for the semantic mapping and authentication. In this use case, the strong authentication may be a user utilizing an identification badge at a card reader. The successful strong authentication allows the user to enter the restricted facility. Upon receiving identification that the strong authentication has been received, the system can access a profile for the user corresponding to the strong authentication. Like the home use case, the system captures user behaviors within the restricted facility and compares them to the behavior profile of the user for the space. Upon a successful match, the system continues to monitor the user, analyze the user behavior, compare the user behavior to the stored behavior profile, and perform the authentication. Upon an unsuccessful match, for purposes of this example, the system sends an alert to a security team which includes a video of the person within the space. The security team can then review the video and take action as needed.

As will be appreciated by one skilled in the art, various aspects may be embodied as a system, method, or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices, and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
identifying, using a semantic mapping authentication system, a strong authentication match of a user has been received for a semantically mapped space;
capturing, using at least one image capture sensor and at least one image depth capture sensor, behaviors of the user within the semantically mapped space;
comparing, using the semantic mapping authentication system, the behaviors of the user against a profile of the user, wherein the profile comprises previously stored behaviors of the user within the semantically mapped space; and
performing, using the semantic mapping authentication system, an authentication action based upon a result of the comparing;
wherein the capturing, comparing, and performing occur at predetermined intervals while the user is within the semantically mapped space.

2. The method of claim 1, wherein the capturing comprises capturing movements of the user within the semantically mapped space and interactions of the user with respect to objects within the semantically mapped space and analyzing the movements and the interactions to identify the behaviors of the user.

3. The method of claim 1, wherein the performing comprises iteratively capturing, comparing, and performing responsive to a match between the behaviors of the user and the profile of the user.

4. The method of claim 1, wherein the performing comprises transmitting a notification to another user responsive to a mismatch between the behaviors of the user and the profile of the user.

5. The method of claim 1, wherein the performing comprises requesting the user provide authentication using a strong authentication technique responsive to a mismatch between the behaviors of the user and the profile of the user.

6. The method of claim 1, wherein the comparing comprises determining, utilizing an artificial intelligence model, whether the behaviors of the user match the profile of the user.

7. The method of claim 1, wherein the profile is populated with previously stored behaviors of the user by analyzing, using an artificial intelligence model, movements and interactions of a user within the semantically mapped space to generate the previously stored behaviors.

8. The method of claim 1, wherein the comparing comprises determining whether the behaviors of the user match the profile of the user within a predetermined threshold level of similarity.

9. The method of claim 1, wherein the at least one image capture sensor and the at least one image depth capture sensor are within an augmented reality device.

10. A system, the system comprising:

at least one image capture sensor;

at least one image depth capture sensor;

a processor operatively coupled to the at least one image capture sensor and the at least one image depth capture sensor;

a memory device that stores instructions that, when executed by the processor, causes the system to:

identify, using a semantic mapping authentication system, a strong authentication match of a user has been received for a semantically mapped space;

capture, using the at least one image capture sensor and the at least one image depth capture sensor, behaviors of the user within the semantically mapped space;

compare, using the semantic mapping authentication system, the behaviors of the user against a profile of the user, wherein the profile comprises previously stored behaviors of the user within the semantically mapped space; and perform, using the semantic mapping authentication system, an authentication action based upon a result of the comparing;

wherein to capture, to compare, and to perform occur at predetermined intervals while the user is within the semantically mapped space.

11. The system of claim 10, wherein the capturing comprises capturing movements of the user within the semantically mapped space and interactions of the user with respect to objects within the semantically mapped space and analyzing the movements and the interactions to identify the behaviors of the user.

12. The system of claim 10, wherein the performing comprises iteratively capturing, comparing, and performing responsive to a match between the behaviors of the user and the profile of the user.

13. The system of claim 10, wherein the performing comprises transmitting a notification to another user responsive to a mismatch between the behaviors of the user and the profile of the user.

14. The system of claim 10, wherein the performing comprises requesting the user provide authentication using a strong authentication technique responsive to a mismatch between the behaviors of the user and the profile of the user.

15. The system of claim 10, wherein the comparing comprises determining, utilizing an artificial intelligence model, whether the behaviors of the user match the profile of the user.

16. The system of claim 10, wherein the profile is populated with previously stored behaviors of the user by analyzing, using an artificial intelligence model, movements and interactions of a user within the semantically mapped space to generate the previously stored behaviors.

17. The system of claim 10, wherein the comparing comprises determining whether the behaviors of the user match the profile of the user within a predetermined threshold level of similarity.

18. A product, the product comprising:

a computer-readable storage device that stores executable code that, when executed by a processor, causes the product to:

identify, using a semantic mapping authentication system, a strong authentication match of a user has been received for a semantically mapped space;

capture, using at least one image capture sensor and at least one image depth capture sensor, behaviors of the user within the semantically mapped space;

compare, using the semantic mapping authentication system, the behaviors of the user against a profile of the user, wherein the profile comprises previously stored behaviors of the user within the semantically mapped space; and perform, using the semantic mapping authentication system, an authentication action based upon a result of the comparing;

wherein to capture, to compare, and to perform occur at predetermined intervals while the user is within the semantically mapped space.

* * * * *